(12) United States Patent
Cramer et al.

(10) Patent No.: US 6,897,259 B1
(45) Date of Patent: May 24, 2005

(54) HEAT STABLE WRINKLE FINISH POWDER COATINGS

(75) Inventors: Michele Le Cramer, Sinking Spring, PA (US); Nancy Lee Osenbach, New Ringgold, PA (US)

(73) Assignee: Rohm and Haas Company, Philadelphia, PA (US)

( * ) Notice: Subject to any disclaimer, the term of this patent is extended or adjusted under 35 U.S.C. 154(b) by 5 days.

(21) Appl. No.: 10/671,276

(22) Filed: Sep. 25, 2003

Related U.S. Application Data

(60) Provisional application No. 60/413,325, filed on Sep. 25, 2002.

(51) Int. Cl.$^7$ .................. C09D 183/06; C09D 5/03; C09D 5/28
(52) U.S. Cl. ................ 525/100; 428/423.1; 428/425.8; 428/447; 525/101; 525/446; 525/474; 525/476; 525/479; 528/26; 528/28
(58) Field of Search .............. 428/423.1, 425.8, 428/447; 525/100, 101, 446, 474, 476, 479; 528/26, 28

(56) References Cited

U.S. PATENT DOCUMENTS

| | | | |
|---|---|---|---|
| 2,884,388 A | * 4/1959 | Hedlund | ............... 106/1.18 |
| 5,256,713 A | 10/1993 | Jacobs, III et al. | |
| 5,422,396 A | 6/1995 | Daly et al. | |
| 5,447,751 A | * 9/1995 | Horinka et al. | ............... 427/257 |
| 5,554,681 A | 9/1996 | Patel | |
| 5,563,200 A | 10/1996 | Daly et al. | |
| 5,573,828 A | 11/1996 | Horinka et al. | |
| 5,695,852 A | * 12/1997 | Richart et al. | ............... 428/152 |
| 5,698,292 A | 12/1997 | Richart et al. | |
| 5,780,560 A | * 7/1998 | Decker et al. | ............... 525/533 |
| 5,795,927 A | * 8/1998 | Decker et al. | ............... 523/401 |
| 5,905,104 A | 5/1999 | Eklund et al. | |
| 5,932,288 A | * 8/1999 | Decker et al. | ............... 427/375 |
| 5,939,491 A | * 8/1999 | Wilt et al. | ............... 525/100 |
| 5,998,560 A | 12/1999 | Decker et al. | |
| 6,034,178 A | 3/2000 | Decker et al. | |
| 6,046,276 A | * 4/2000 | Ambrose et al. | ............... 525/101 |
| 6,133,384 A | * 10/2000 | Decker et al. | ............... 525/533 |
| 6,180,726 B1 | 1/2001 | Edlund et al. | |
| 6,248,824 B1 | 6/2001 | Decker et al. | |
| 6,316,049 B1 | * 11/2001 | Decker et al. | ............... 427/195 |
| 2002/0028879 A1 | 3/2002 | Chasser et al. | |
| 2002/0037973 A1 | 3/2002 | Ambrose et al. | |

FOREIGN PATENT DOCUMENTS

| | | |
|---|---|---|
| EP | 0 575 034 B | 12/1993 |
| EP | 0 671 445 | 9/1995 |
| EP | 0 990 681 A | 4/2000 |
| JP | 05-320578 A | * 12/1993 |
| WO | WO 99/35195 | 7/1999 |

OTHER PUBLICATIONS

Data Base WPI, Derwent Publications Ltd., Patent Abstract of Japan, vol. 018, No. 145 (C–1178), Mar. 10, 1994; JP 05320578 A (Kansai Paint Co Ltd), Dec. 3, 1993; "Coating Composition".

Patent Abstract of Japan; JP05039443, (Kansai Paint Co Ltd); Feb. 19, 1993; "Wrinkle Coating Compound Composition".

W. Jacobs, et al, "Durable glossy, matte and wrinkle finish powder coatings crosslinked with tetramethoxymethyl glycoluril"; Progress in Organic Coatings,29 (1996) (no month) pp. 127–138.

JP 05 320578 A (Kansai Paint Co. Ltd); Dec. 3, 1993, (Abstract Only).

* cited by examiner

Primary Examiner—Anthony J. Green
(74) Attorney, Agent, or Firm—Andrew E. C. Merriam

(57) ABSTRACT

The present invention provides a powder composition for forming a heat stable wrinkle finish coating and the wrinkle finish coatings formed there from. The composition of the present invention comprises a resin consisting essentially of one or more than one silicone resin having a condensable hydroxyl content of from 2% by weight to 7% by weight, a curing agent, preferably an aminoplast, and a wrinkle finish forming catalyst, preferably an amine salt of triflic acid. In another embodiment, the powder composition of the present invention may comprise a hydroxyl functional resin, preferably a polyester, mixed with the said silicone resin to aid in the adhesion of the coating to a substrate. The composition of the present invention may further comprise up to 60 phr of a filler, such as wollastonite, to aid in heat stability. The coatings of the sent invention provide outstanding heat stability at temperatures greater than 350° F. and up to 550° F., preferably up to 650° F., for use on automobile or motorcycle exhaust systems, engine covers, manifolds, mufflers and engine parts, moves, fireplaces, stovepipes, grilles, ovens, and barbecue equipment, boilers, kettles, furnaces, steam lines, heat exchangers and any surface routinely exposed to high heat for an extended time.

10 Claims, No Drawings

HEAT STABLE WRINKLE FINISH POWDER COATINGS

RELATED PATENT APPLICATIONS

This is a non-provisional application of prior U.S. provisional application Ser. No. 60/413,325 filed Sep. 25, 2002 now abandoned.

FIELD OF THE INVENTION

The present invention provides wrinkle forming coating powders and heat stable wrinkle finish coatings formed therefrom. In particular, the present invention provides a silicone resin-containing wrinkle finish powder coating which can withstand temperatures of at least 350° F. (177° C.) for an extended time period.

BACKGROUND OF THE INVENTION

"Wrinkle finishes," as used in the present specification, are reticulated, i.e., made up of a pattern of raised veins across the surface, and are exemplified by interconnected star-burst patterns, mosaics, and by patterns similar to that of an alligator or an elephant hide. In contrast to wrinkle finishes, "texture finishes" comprise uneven patterns of raised bumps, and nodules in rough surfaces which resemble sand paper and which may include broken portions of a wrinkle finish. A texture finish usually contains pinholes and surface defects resulting from the failure of the finish to cover an entire surface.

Wrinkle finishes are desired in many applications and are commonly applied to office equipment such as typewriters, staplers, dictating equipment, file cabinets, tool boxes, and the like. In addition to being aesthetically pleasing, these finishes have certain utilitarian functions: they hide the surface defects of a substrate even when applied in thin films and, having a low gloss, they do not show scratches. Wrinkle finishes have been applied from powder coatings in which the surface sets up first and, when the rest of the coating cures, the resulting shrinkages deform the previously set surface and cause a fine wrinkle pattern to develop on the surface of the coating. However, the art has made little mention of heat resistant powder coating wrinkle finishes, e.g. for use in coating automobile or motorcycle engine covers, parts, exhaust systems and manifolds, stoves, stacks, stovepipes, grilles, cooking utensils, heat exchangers and fireplaces. Further, finish control problems, i.e. where texture finishes undesirably result, have plagued the development of wrinkle finishes from powder coatings.

U.S. Patent Application Publication 2002/0028879A1, to Chasser et al., discloses powder coatings and methods for forming a wrinkle finish using carbamate functional polymers mixed with a curing agent. As exemplary curing agents, Chasser et al. disclose silicon-containing resins which confer added heat resistance to a powder coating. However, the carbamate group-containing polymers of Chasser et al. are very highly functionalized, having a carbamate equivalent weight within the range of 15 to 150 and a number average molecular weight of from 500 to 20,000. The highly functionalized carbamate-functional polymers of Chasser et al. tend to cure too quickly, often giving a bumpy textured finish rather than a controlled and predictable wrinkle finish.

Heat-resistant powder coating finishes comprising silicone resins are known, albeit without disclosure of a way to form a wrinkle finish using them. Chasser et al. do not provide powder coatings which comprise a resin consisting essentially of silicone resin, i.e. as the only resin present, because silicone resins are known to adhere poorly to most substrates. Chasser et al. attempt to remedy these deficiencies by adding highly functionalized carbamate group-containing resins to the powder coatings which, as discussed above, react too quickly to allow for the achievement of a controlled wrinkle finish.

In overcoming the above-mentioned deficiencies in powder coatings, the present inventors have discovered a powder coating which results in a surprisingly consistent wrinkle finish that is highly heat resistant at 350° F. (285° C.) or higher, preferably from 550° F. to 650° F. In accordance with the present invention, a powder coating provides a heat resistant wrinkle finish which avoids the finish control problems of highly functionalized resins.

SUMMARY OF THE INVENTION

The present invention provides a powder composition for forming a heat stable wrinkle finish, wherein the composition comprises a resin consisting essentially of a silicone resin or more than one silicone resin, wherein the silicone resin has a condensable hydroxyl content of from 2% by weight to 7% by weight, a curing agent, preferably an aminoplast, and a wrinkle finish forming catalyst, preferably an amine salt of triflic acid or cyclamic acid.

In another embodiment according to the present invention, a powder composition for forming a heat stable wrinkle finish comprises one or more than one hydroxyl functional resin, and one or more than one silicone resin, wherein the silicone resin has a condensable hydroxyl content of from 2% by weight to 7% by weight, a curing agent, and a catalyst selected from the group consisting of an amine salt of triflic acid and cyclamic acid. The hydroxyl functional resin may be an acrylic or a polyester resin, preferably a polyester resin having a hydroxyl number, absent functionalization or blocking, of from 20 to 50 and an acid number, absent functionalization or blocking, of 12 or less. Suitable acrylic resins for use in the present invention have a glass transition temperature (Tg) of 45° C. or higher and a hydroxyl number, absent functionalization or blocking, of from 0.7 to 50.

The heat stability of any wrinkle finish made from a powder composition according to the present invention may preferably be enhanced by adding to the powder composition a filler selected from the group consisting of wollastonite, barium sulfate and mixtures thereof.

The powder composition of present invention provides a heat stable, controlled wrinkle finish on various substrates including, but not limited to, automobile or motorcycle exhaust systems, engine covers, engine cases, cylinders and cylinder heads, engine parts, manifolds, mufflers, industrial exhaust systems and stacks, stoves, woodstoves, fireplaces, stovepipes, ovens, barbecue grills and equipment, cooking utensils, boilers, kettles, furnaces, steam lines, heat exchangers and any surface routinely exposed to high heat for an extended time period. The wrinkle finish coating according to the present invention provides heat resistance in extended use at temperatures greater than 350° F., preferably greater than 550° F. and up to 650° F.

DETAILED DESCRIPTION OF THE INVENTION

A heat stable wrinkle finish formed from the powder composition of the present invention may withstand temperatures of at least 350° F. (177° C.), preferably at least 550° F. (285° C.), and up to 650° F. for a continuous period of at least 1 hour, and, preferably, for more than 12 hours.

Herein, unless otherwise indicate, percentages are by weight. Further, unless otherwise indicated, the total amount of resins in the powder compositions of the present invention are calculated at 100 parts by weight (pbw), and other components are expressed as weight parts relative to 100 parts by weight of the resin (phr).

In an embodiment of the present invention, a powder composition for providing a heat stable wrinkle finish comprises a resin consisting essentially of one or more than one silicone resin which has a condensable hydroxyl content of from 2% by weight to 7% by weight, a curing agent, a wrinkle finish forming catalyst and, optionally, one or more than one filler. In accordance with this embodiment of the present invention, the binder in the powder composition is 100% of one or more than one silicone resin having a condensable hydroxyl content of from 2% by weight to 7% by weight.

In another embodiment of the present invention, a powder composition for providing a heat stable wrinkle finish comprises 100 pbw of a resin including 40 to 100 pbw of one or more than one silicone resin having a condensable hydroxyl content of from 2% by weight to 7% by weight, and 0 to 60 pbw of one or more than one hydroxyl functional resin, preferably a polyester resin, a curing agent, a wrinkle finish forming catalyst and, optionally, one or more than one filler. Adhesion to substrates is improved in the coating formed thereby due to the addition of the hydroxyl functional resin in the powder composition.

In a preferred embodiment of the present invention, a powder composition for providing a heat stable wrinkle finish comprises 100 pbw of a resin, including 40 to 100 pbw of one or more than one silicone resin having a condensable hydroxyl content of from 2% by weight to 7% by weight, and 0 to 60 pbw of one or more than one hydroxyl functional resin, a curing agent, an amine salt of triflic acid as a catalyst, and, optionally, up to 60 phr, preferably 30–50 phr, of one or more than one filler. The filler provides enhanced heat stability in a coating made from the powder composition, while the hydroxyl functional resin improves the adhesion of the coating to a substrate. If more than 60 pbw of the hydroxyl functional resin is added, a wrinkled finish cannot be consistently produced in a coating, and the coating often becomes bumpy or textured. The wrinkle finish provided in the preferred embodiment of the present invention resembles an alligator hide, and is called a "gator" finish.

In yet another embodiment of the present invention, a wrinkle finish other than a gator finish is provided by a powder composition comprising 60 to 90 pbw of one or more than one hydroxyl functional resin, 10 to 40 pbw of one or more than one silicone resin having a condensable hydroxyl content of from 2% by weight to 7% by weight, a curing agent, a cyclamic acid catalyst, and, optionally, one or more than one filler. If more than 40 pbw of the silicone resin(s) is used, a wrinkled finish cannot be consistently produced in a coating, and the coating often becomes bumpy or textured. If less than 10 pbw of silicone is used, there is no improvement observed in the heat stability of the coating.

As used herein, the phrase "wrinkle finish" refers to a reticulated finish made up of a pattern of raised veins across the surface and are exemplified by interconnected star-burst patterns, mosaics, and by patterns similar to that of an alligator hide (a "gator" finish) or an elephant hide.

As used herein, the phrase "resin" refers to one or more than one reactive organic monomer, oligomer or polymer and does not include a curing agent.

As used herein, the phrase "polymer" refers to polymers and copolymers alike.

As used herein, the phrase "(meth)acrylate" refers to either or both acrylates and methacrylates.

As used herein, the phrase "acrylic" refers to both acrylic and methacrylic polymers and copolymers and includes (co)polymers of acrylate and methacrylate monomers containing about 10% or less by weight of other monomers, such as acrylic acid, methacrylic acid, styrene, acrylamide, methacrylamide, difunctional and trifunctional (meth)acrylates, and hydroxyalkyl (meth)acrylates.

As used herein, the phrase "hydroxyl number" refers to the number of milligrams (mg) of KOH equivalent to the hydroxyl groups present in each gram (g) of polymer and has the units (mg KOH/g polymer).

As used herein, the phrase "acid number" refers to the number of mg KOH required to neutralize the alkali-reactive groups in 1 g of polymer and has the units (mg KOH/g polymer). The acid number is determined according to ASTM standard test method D 1639-90.

As used herein, the "glass transition temperature" or Tg of any polymer may be calculated as described by Fox in *Bull. Amer. Physics. Soc.*, 1, 3, page 123 (1956). The Tg can also be measured experimentally using differential scanning calorimetry (rate of heating 20° C. per minute, Tg taken at the midpoint of the inflection). Unless otherwise indicated, the stated Tg as used herein refers to the calculated Tg.

As used herein, the phrase "wrinkle finish forming catalyst" refers to cyclamic acid or cyclohexylsulfamic acid, amine salts of organic acids, wherein the organic acids may include trifluoromethane sulfonic acid, also known as triflic acid, paratoluene sulfonic acid, dodecyl benzene sulfonic acid, dodecyl naphthyl sulfonic acid, and dodecyl naphthyl disulfonic acid, stannous methane sulfonate, and amine salts of inorganic acids, such as phosphonic acids.

As used herein, the phrase "absent functionalization or blocking" refers to a polymer as it would be if no hydroxyl or acid groups had been blocked or functionalized. For example, a polyester having a hydroxyl number of 10 and having two carbamate functional groups that were previously added to hydroxyl groups in the polyester would be said to have a hydroxyl number of 12, absent functionalization.

The silicone resin in the powder composition of the present invention comprises organic substituents, in addition to hydroxyl groups, including monovalent hydrocarbons, alkoxy groups and (alkyl)aryloxy groups, as well as siloxanes or silsesquioxanes substituted with monovalent hydrocarbons, hydroxyl groups, alkoxy groups and (alkyl)aryloxy groups. Examples of monovalent hydrocarbons include, but are not limited to, phenyl, methyl, $C_2$ through $C_{24}$ alkyl or (alkyl)aryl, and mixtures thereof. Among the silicone resins useful in the present invention are compounds of formula (I):

$$R_xR_ySiO_{(4-x-y)/2} \qquad (I)$$

wherein each of $R_x$ and $R_y$ is independently a monovalent hydrocarbon group, another group of formula (I), or $OR^1$, wherein $R^1$ is H or an alkyl or an aryl group having 1 to 24 carbon atoms, and wherein each of x and y is a positive number such that $0.8 \leq (x+y) \leq 4.0$.

For high temperature stability, silicone resins useful in the invention may have a degree of organic substitution as described in "Silicones in Protective Coatings", by Lawrence H. Brown (in *Treatise on Coatings* Vol. 1, Part III, "Film-Forming Compositions" pp. 513–563, R. R. Meyers and J. S. Long eds. Marcel Dekker, Inc. New York, 1972) of about 1.5 or less, typically between about 1 and about 1.5. Specifically, degree of substitution is defined as the average number of substituent organic groups per silicon atom and is the summation of the mole percent multiplied by the number of substituents for each ingredient. For the best heat stability, methyl and phenyl groups are the preferred monovalent hydrocarbons. Generally, the more phenyl groups, the higher the heat-resistance provided. The silicone resins compositions may include organo-siloxanes comprising units, including dimethyl, diphenyl, methylphenyl, phenylpropyl and their mixtures. Preferably, silicone resins of the present invention comprise random mixtures of methyl and phenyl groups, dimethyl siloxane and diphenyl siloxane groups, or phenylmethylsiloxane groups, wherein the ratio of phenyl to methyl groups is 0.5 to 1.5:1, more preferably 0.7:1 to 1.1:1.

The silicone resin of the present invention self-condenses at high end-use temperatures, e.g., that of a barbecue grill or an automobile exhaust part. This requires silanol functionality (Si—O—H). The silicone resin of the present invention may have a condensable hydroxyl content of from 2 to 7 wt. %, more preferably from 3 to 5 wt. %. The condensable hydroxyl content should not be too high lest excess water outgasses during curing of the coating powder, resulting in foaming. On the other hand, the lower end of the condensable hydroxyl content range is important because below this the coating powder will cure too slowly to be suitable for commercial applications. In addition, the desirable hydroxyl content of the silicone resin of the present invention may vary depending on the catalyst used in the present invention.

The silicone resin according to the present invention has a viscosity of between about 500 and about 10,000 cps at 150° C., preferably 2000 to 5000 cps. These viscosity parameters are required for appropriate melt-flow of the molten coating powder at the temperatures at which the coating powder is fused and cured.

For forming powder coatings, the silicone resins of the present invention should be solid at room temperature and preferably have a Tg of 55° C. or above, preferably 60° C. or above. The lower limits of Tg recited above are necessary to prevent undue blocking of a coating powder. The tendency of a powder to sinter or block is an important measure of its commercial value. Minor blocking is normal for powders. A tendency to excessively block can make cold storage, shipping, and handling necessary. Badly blocked powder is useless and must be discarded. Blocking is measured by weighing a 1" diameter cylinder of powder 1 inch (2.54 cm) deep with 110 grams at 110° F.(43° C.) for 24 hours and evaluating the difficulty of breaking the sample back into usable powder.

The silicone resin of the present invention should contain 0.2% or less of organic solvents, preferably 0.1% or less. However, most commercial silicone resins contain some residual organic solvent as a consequence of the process of silicone resin synthesis. Such organic solvent tends to be internally trapped within the silicone resin and is generally not removed when the silicone resin is melt blended with other components to form a coating powder composition. Accordingly, it may be necessary to substantially remove such residual organic solvent. This is accomplished by melting the silicone resin and removing solvent from the molten resin, e.g., by sparging with a gas, such as nitrogen, or by vacuum.

An exemplary silicone resin in accordance with the present invention was made by removing solvent from a commercial silicone resin, which process also further polymerized the resin, i.e., Dow Corning 6-2230. In a melt polymerization, residual solvents, absorbed water and water of condensation were removed by nitrogen sparging, followed by cooling the resin and then chilling it to a solid on a flaker. This "flaking" process yields a resin with a Tg high enough to eliminate blocking problems. The resin also exhibited a desirable combination of low outgassing during cure, acceptable viscosity and fast cure speed when catalyzed properly.

Examples of commercially available silicone resins useful in the present invention are "flaked" resins made from Wacker Silres® SY-430 phenylsilicone, Wacker Silres® MK, Wacker Silres® 604, and Wacker Silres® 601 phenylsilicone, each from Wacker Silicone Corp., (Adrien, Mich.), Dow Corning® 1-0543, Dow Corning® 6-2230 methylphenylsilicone, and Dow Corning® Z-6018 propylphenyl silicone, each from Dow Corning (Midland, Mich.), General Electric SR-355 from General Electric (Waterford, N.Y.); and PDS-9931 from Gelest, Inc., (Tullytown, Pa.), and those resins prepared from organochlorosilanes, such as methyltrichlorosilane, phenyltrichlorosilane and dimethyldichlorosilane by dehalogenation. Other suitable silicone resins for use in the invention are discussed in Silicones in Protective Coatings, supra.

A particularly preferred resin, which can be used without "flaking" is Morkote® S-101, from Rohm and Haas Company, Philadelphia, Pa.

In an embodiment of the present invention, wrinkle finish powder coatings are derived from compositions comprising hydroxy-functional resins, exemplified by hydroxy-functional polyesters or hydroxy-functional acrylate and methacrylate resins, in admixture with one or more than one silicone resin, wherein the silicone resin has a condensable hydroxyl content of from 2% by weight to 7% by weight.

The polyester resin is predominantly hydroxyl in functionality and has an acid number of preferably 12 or less and, more preferably, not more than 5. The hydroxyl number, on the other hand, may be from about 20 to about 50 mg KOH/g polymer. The amount of curing agent used depends on the hydroxyl number; as the number goes up, so does the amount of curing agent.

The weight average molecular weight (Mw) of the polyester resin may range from about 1,000 to about 40,000, preferably between about 1,500 and about 10,000. The hydroxyl functionality of the resin, i.e. the average number of hydroxyl groups present in each molecule of the resin, is 2 or more and preferably 2.2 or more, and more preferably 3.5 or more. The upper limit of hydroxyl functionality, a molecular function, should correspond to the upper limit of hydroxyl number, a molecular weight function.

The Tg of the polyester resin of the present invention may be higher than 50° C., preferably higher than 55° C. so as to prevent blocking in a powder composition containing the polyester resin.

Polyester resins according to the present invention are made from aromatic and/or saturated aliphatic acids and polyols by methods which are conventional in the art. The reactants may be heated to a temperature in the range of from about 135° C. to 220° C. (about 275° F. to 430° F.) while being sparged with a stream of inert gas such as nitrogen to remove water as it forms. Vacuum or an azeotrope-forming solvent may be used at the appropriate temperature to assist the removal of water. Examples of aliphatic polycarboxylic acids include succinic acid, glutaric acid, adipic acid, pimelic acid, suberic acid, azelaic acid, sebacic acid, diglycolic acid, 1,12-dodecanoic acid, tetrapropenyl succinic acid, maleic acid, fumaric acid, itaconic acid, malic acid, etc. Examples of aromatic polycarboxylic acids are phthalic acid and its anhydride, isophthalic acid, benzophenone dicarboxylic acid, diphenic acid, 4,4-dicarboxydiphenyl ether, 2,5-pyridine dicarboxylic acid, trimellitic acid, etc. Among the suitable polyols are ethylene glycol, 1,3-propylene glycol, diethylene glycol, neopentyl glycol, and trimethylolpropane. Mixtures the acids and of the polyols may be used. A catalyst such as p-toluene sulfonic acid may be used to speed up the reaction.

Commercially available polyesters useful in the composition of the present invention may comprise Morkote® 98HT, from Rohm and Haas Company, Philadelphia, Pa., Crylcoat® 820, from UCB, Smyrna, Ga., Alftalat® AN 745, from Solutia, St. Louis, Mo., Rucote® 625, from Bayer; Hicksville, N.Y., Uralac® P6505, from DSM; Elmwood Park, N.J., Sparkle® SP400, from Sun Polymers, Mooresville, Ind.

Hydroxy-functional acrylate and methacrylate polymers useful in the compositions of the present invention are exemplified by the copolymers of alkyl esters of acrylic and methacrylic acid, wherein the alkyl group contains from 1 to 8 carbon atoms, with hydroxyalkyl (meth)acrylates, such as hydroxyethyl and hydroxypropyl acrylate and methacrylate. Useful comonomers include, styrene, ethylene, propylene, vinyl monomers, and difunctional and trifunctional (meth) acrylates. The acrylic polymers should have a Tg of 45° C. or higher to prevent blocking and a hydroxyl number, absent functionalization or blocking, of from 0.7 to 50 to insure adequate curing.

The acrylic resins of the present invention may comprise the reaction product of from 0.1 to 5 weight % of hydroxyl functional comonomers, based on the weight of all monomers used to form the resin, and may comprise the reaction product of up to 10% by weight of other comonomers, based on the weight of all monomers used to form the resin. The remainder of the monomers used to the acrylic resins of the present invention should comprise alkyl (meth)acrylates.

The acrylic resins may be formed from exemplary acrylic monomers known in the art, such as methyl acrylate, methyl methacrylate, ethyl acrylate, acrylic acid, methacrylic acid, butyl acrylate, butyl methacrylate, etc. Styrene or alpha-methyl styrene monomers may also be incorporated, particularly to increase glass transition temperature of the acrylic copolymer.

Mixtures of the hydroxy-functional resins are also useful in the practice of this invention.

The powder compositions of the present invention further comprise a curing agent having functional groups reactive with the hydroxyl functional groups of the silicone resin and, if present, the hydroxyl functional polymer. The curing agent can be any compound having functional groups reactive with the hydroxyl functional groups. The curing agent may be selected from the group consisting of blocked isocyanates, triazine compounds, aminoplast resins, such as glycoluril resins, and mixtures thereof. Aminoplast resins, particularly hexamethoxymethyl melamine and tetramethoxymethyl glycoluril exemplify the preferred curing agents. Curing agent concentration may desirably be from 2 to 12 phr, preferably from 6 to 10 phr.

Conventional aminoplast crosslinkers can be used, provided that the Tg of the coating is not lowered to an undesirable extent. Aminoplasts are the oligomeric reaction products of aldehydes, such as formaldehyde and glyoxal, with amino- or amido-group-carrying substances exemplified by melamine, urea, dicyanodiamide, and benzoguanamine. Hexa(methoxymethyl) melamine (HMMM), urea/glyoxal condensation products and the alkoxylated derivatives thereof are examples of such a curing agent. A curing agent in solid form, such as tetra (methoxymethyl) glycoluril is preferred for convenience in formulation. It is possible to use mixtures of the aminoplast resins.

A particularly preferred class of aminoplast resins include aldehyde condensates of glycoluril, which give high melting crystalline products useful in powder coatings. Formaldehyde is the aldehyde most often used to form the condensates, but any of the aldehydes mentioned above can be employed. Glycoluril resins suitable for use as the curing agent (b) in the powder coating compositions of the invention include POWDER LINK 1174, a tetra (methoxymethyl) glycoluril commercially available from Cytec Industries, Inc. of Stamford, Conn. Other aminoplast crosslinking agents are sold by Cytec under the trademark Cymel.

The blocked isocyanates suitable for use as the curing agent in the powder compositions of the present invention are known compounds and can be obtained from commercial sources or may be prepared according to published procedures. Upon being heated to cure the powder coating compositions, the isocyanates are unblocked and the isocyanate groups become available to react with the hydroxyl functional groups of the silicone resin and, if present, the hydroxyl functional polymer. Any suitable aliphatic, cycloaliphatic or aromatic alkyl monoalcohol known to those skilled in the art can be used as a blocking agent for the isocyanate. Other suitable blocking agents include oximes and lactams. Non-limiting examples of suitable blocked isocyanate curing agents include those based on isophorone diisocyanate blocked with .epsilon.-caprolactam; toluene 2,4-toluene diisocyanate blocked with .epsilon.-caprolactam; or phenol-blocked hexamethylene diisocyanate. Preferred blocked isocyanate curing agents include BF 1530, which is the reaction product of epsilon-caprolactam blocked T1890, a trimerized isophorone diisocyanate ("IPDI") with an isocyanate equivalent weight of 280, and BF 1540, a uretidione of IPDI with an isocyanate equivalent weight of 280, all of which are available from Creanova of Somerset N.J.

Also useful for crosslinking hydroxyl functional group-containing materials are triazine compounds, such as tricarbamoyl triazine compounds.

The wrinkle forming catalyst used in the composition of the present invention catalyst can be an amine salt of any inorganic or organic acid, or it can be an amic acid. Non-limiting examples of suitable inorganic acids include phosphonic acids, and sulfonic adducts thereof. Non-limiting examples of suitable organic acids include substituted sulfonic acids, such as paratoluene sulfonic acid, dodecyl benzene sulfonic acid, dodecyl benzene disulfonic acid, dodecyl naphthyl sulfonic acid, and dodecyl naphthyl disulfonic acid. Examples of amines suitable for forming the acid salts include ammonia, amines having the formula $R_xN$ wherein R is an alkyl group, preferably one having from 1 to 4 carbon atoms, and x is from 1 to 3, such as methyl-, dimethyl-, and trimethylamine, ethylamine, propylamine, dipropylamine, butylamine, triethyl amine and dibutylamine. Other useful amines include benzylamine, ethanolamine, dimethyl ethanol amine, N,N'-diethyl ethanolamine, diisopropanolarine, and morpholine. Diethylamine salts are a preferred catalyst for the wrinkle-forming curing process of this invention. Mixtures of amines and the imine versions of the above can also be used. Non-limiting examples of amic acids useful in the compositions of the present invention include cyclohexanesulfamic acid, also known as cyclamic acid.

The catalyst of the present invention is preferably an amine salt of trifluoromethanesulfonic acid, also known as triflic acid, preferably its diethylamine salt. The amine salt of triflic acid is referred to as amine triflate. An amine triflate, causes a remarkably abrupt dulling of the surface of molten powder and the formation of a skin within seconds of fusion, followed by a slumping of the skin as the resinous mass is cured beneath it. The amine salts may suitably be used as solutions in a mixture of water and a polar organic solvent such as a glycol ether. The diethylamine triflate is available from 3M as FC-520 Resin Catalyst, a 60% solution in a 50/50 mixture of water and diethyleneglycol monoethyl ether.

The wrinkle forming catalyst used in the composition of the present invention may be used in an amount of from 0.2 to 1.0 phr, and desirable amounts may vary depending on the catalyst. For example, the preferred amine triflate may be used in the amount of from 0.2 phr to 0.4 phr, preferably from 0.22 to 0.35 phr. Further, cyclamic acid salt catalyst may be used in the amount of from 0.2 to 1.0 phr, preferably from 0.3. to 0.5 phr.

Heat stability in wrinkle finishes formed according to the present invention may be enhanced by adding to the powder compositions of the present invention a filler in the amount of up to 60 phr, preferably from 30 to 50 phr. Suitable fillers which do not interfere with the formation of a wrinkle finish may include wollastonite, such as Nyad 325, from Nyco Minerals Company, Calgary, Alberta, Canada, barium sulfate, such as 1090P Blanc Fixe, from Polar Minerals, Mt. Vernon, Ind. or 1075 Barite, from Polar Minerals, Mt. Vernon, Ind., calcium metasilicate, mica glass rods, glass whiskers, feldspar, and mixtures thereof. Preferably, the filler comprises wollastonite, barium sulfate and mixtures thereof. Most preferably, the filler comprises wollastonite.

In accordance with an embodiment of the present invention, the powder composition may further comprise a carbamate group-containing polymer. Carbamate groups react with the same curing agents as hydroxyl groups. Non-limiting examples of polymers having pendent and/or terminal carbamate functional groups useful in the powder coating compositions of the invention as an added polymer include the carbamate functionalized acrylic and polyester polymers of the present invention, and mixtures thereof. For example, a useful acrylic polymer has a hydroxyl number of from 0.7 to 50, absent the carbamate functionalization. Preferably, carbamate functional group-containing polyester polymers are used which have a hydroxyl number, absent the carbamate functionalization, of from 20 to 50 and an acid number, absent the carbamate functionalization, of 12 or less are preferred.

Non-limiting examples of carbamate functional polyester polymers suitable for use in the powder compositions of the present invention include the polyesters and acrylic polymers of the present invention that have been carbamate functionalized. Pendent and/or terminal carbamate functional groups may be incorporated into the polyester by first forming a hydroxyalkyl carbamate which can be reacted with the available acid and hydroxyl groups present in the polyester. For example, the hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material or by reacting isocyanic acid with a hydroxyl functional polyester. Preferably, carbamate groups can be incorporated into the polyester polymer by a "transcarbamoylation" reaction in which a hydroxyl functional polyester is reacted with a low molecular weight carbamate derived from an alcohol or a glycol ether. The carbamate groups exchange with the hydroxyl groups yielding the carbamate functional polyester polymer and the original alcohol or glycol ether. Pendent and/or terminal carbamate functional groups can be incorporated into the acrylic polymer of the instant invention by reacting a hydroxyl group of the acrylic polymer with a diisocyanate, such as isophorone diisocyanate or hexamethylene diisocyanate, via a transcarbamoylation process similar to the one described above in connection with the incorporation of carbamate groups into polyester polymers, or by reacting isocyanic acid (HNCO) with the hydroxyl groups of the acrylic polymer of the present invention.

Colorants useful in the powders of the present invention may include carbon black, such as Raven 22, from Columbian Chemicals Co., Atlanta, Ga. or 9875 Black, from Engelhard Corporation, Solon, Ohio, metal flakes, and heat resistant pigments, such as the various iron oxide pigments and mixed metal oxide pigments. The amount of colorant may range up to 20 phr, and preferably ranges from 0.1 to 15 phr, more preferably from 0.5 to 10 phr.

Flow control agents can be present in the powder compositions of the present invention in amounts of up to about 1.5% by weight, and preferably from about 0.5% by weight to about 1.5% by weight, based on the total composition solids. Composition having about 0% by weight to less than 0.2% by weight of flow control agent are also quite useful, as are compositions with less than about 0.15% by weight, less than 0.10% by weight, and less than 0.05% by weight of flow control agent. Useful flow control agents may include acrylics, silicon containing compounds and fluorine-based polymers. Examples of commercially available flow control agents include Resiflow P-67® acrylic oligomer and Clearflow Z-340® from Estron Chemical, Inc. (Calvert City, Ky.); Modaflow® 2000 acrylic copolymer from Monsanto (St. Louis, Mo.); Modarez® MNP silica/silicate mixture and Modarez® 23-173-60 silicone acrylate on silica, from Synthron, Inc. (Morgantown, N.C.); and BYK® Powder Flow 3 polyacrylate/polysiloxane and BYK® 361 acrylate copolymer, from BYK Chemie (Wallingford, Conn.). Said agents enhance the compositions melt-flow characteristics and help eliminate surface defects.

Other useful ingredients include degassing agents, such as benzoin, DSM Resins, Inc., Elmwood Park, N.J., in the amount of 0.01 to 1 weight %, based on the weight of the composition.

Powder compositions according to the present invention may be made in a conventional manner. After preparing silicone resins as flakes, the components of the coating powder may be batched and shaken, e.g., for 5 minutes, to blend well, followed by extrusion. The extruded product may then be allowed to cool, chipped, ground and screened to obtain a powder of appropriate size. Average particle size is typically 20–80 microns. Scalping at 100 mesh is typical to remove coarse particles. Typically, 10% by weight of particles have a diameter below 10 microns. The amount of material retained on a 325 mesh is typically between about 30 to 50 wt. %. The powder is then applied in a conventional manner, e.g., electrostatically, to a substrate. The substrate is heated at the time of application and/or subsequently so that the coating particles form a continuous film.

The powder compositions provided by the present invention may be applied on a substrate using electrostatic spray, triboelectric spray, magnetic brush, hot flocking or fluidized bed methods. The coated substrate is then heated to cure the applied powder compositions so that the substrate reaches a temperature in a range from 270° F. (133° C.) to 550° F. (290° C.), and preferably from 340° F. (171° C.) to 425° F.

(222° C.), and more preferably from 355° F. (180° C.) to 400° F. (208° C.).

The wrinkle finish powder compositions according to the present invention provide excellent heat resistant properties and may be coated on steel, aluminized steel, aluminum, and various articles, particularly automobile or motorcycle exhaust systems, engine covers, engine cases, cylinders and cylinder heads, manifolds, mufflers, industrial exhaust systems and stacks, stoves, woodstoves, fireplaces, stovepipes, grills, ovens, barbecue grills and equipment, cooking utensils, boilers, kettles, furnaces, steam lines, heat exchangers and any surface routinely exposed to high heat for an extended time period. Alternatively, the powder compositions may be formed into a thin-film, laminate or, if formed adjacent a removable layer or layers, decalcomania.

EXAMPLES

Example Preparation in all Examples

Coating powders were prepared in accordance with this invention by thoroughly blending all of the ingredients identified in each of Examples 1–13 in Tables 1A and 1 B. The blend was then melt mixed on a 1" Baker Perkins twin screw extruder with the front zone set to 180° F. and the rear zone left unheated. The extrudate was then chipped and ground with 0.2% fumed silica (Cabot) to a fine powder that was passed through a 60 mesh screen (US Standard).

Precleaned aluminum test panels (from "Q" Panel Co.) measuring 0.025" X 3" X 6" were coated using standard electrostatic spray techniques and baked in an oven at 400° F. for 15 minutes to give a coating having a thickness between 2 and 5 mils. The initial adhesion of each sample was measured based on ASTM D3359B. Each coating that gave the desired wrinkle appearance was subjected to testing at 550° F. for 2 hours followed by a water quench. The color, gloss, and pattern retention were then evaluated.

Raw Materials

Silicone resins-Morkote S-101, Rohm and Haas Company (Examples 5 to 12) Silres 604-Wacker Silicones Corporation (Examples 1 to 4 and 13 to 18)
Polyester resin-Morkote 98 HT P, Rohm and Haas Company
Curing agent-POWDERLINK™1174, Cytec Industries Inc., Stamford, Conn.
Catalyst-FC 520, 3M Company

TABLE 1A

Gator Wrinkle Finishes in Various Formulations

| Ingredient | Ex 1 | Ex 2 | Ex 3 | Ex 4 | Ex 5 | Ex 6 | Ex 7 |
|---|---|---|---|---|---|---|---|
| Silicone Resin | 100 | 100 | 100 | 100 | 100 | 60 | 80 |
| Polyester Resin | — | — | — | — | — | 40 | 20 |
| Curing agent Tetramethoxymethyl Glycoluril | 10 | 10 | 10 | 10 | 10 | 10 | 10 |
| Catalyst Trifluoromethanesulfonic Acid Diethylamine salt | 0.24 | 0.45 | 0.33 | 0.24 | 0.24 | 0.24 | 0.24 |
| Filler Wollastonite Barium Sulfate | 60 | 60 | 60 | 30 | 30 | 30 | 30 |
| Flow Control Resiflow P67 | 1.2 | 1.2 | 1.2 | 1.2 | 1.2 | 1.2 | 1.2 |
| Black pigment Carbon Black | 3 | 3 | 3 | 3 | 3 | 3 | 3 |
| Wrinkle Appearance | Yes Gator | No Texture | Yes Blotchy Gator | Yes Gator | Yes Gator | Yes Gator | Yes Gator |
| Initial Adhesion | 2B | 1B | 1B | 3B | 3B | 5B | 4B |
| Appearance after 550° F. for 2 hours | Retains color, gloss, and pattern | Not tested | Not tested | Loss of adhesion | Retains color, gloss, and pattern | Retains gloss and pattern, slight yellowing | Retains color, gloss, and pattern |

Examples 1, 2 and 3 illustrate changing level of FC 520 and changing filler type.
Examples 4 and 5 illustrate changing silicone resin.
Examples 5, 6, 7 and 8 illustrate effect of changing Si/PE ratio.

TABLE 1B

Gator Wrinkle Finishes in Various Formulations

| Ingredient | Ex 8 | Ex 9 | Ex 10 | Ex 11 | Ex 12 |
|---|---|---|---|---|---|
| Silicone Resin | 40 | 60 | 60 | 60 | 60 |
| Polyester Resin | 60 | 40 | 40 | 40 | 40 |
| Curing agent Tetramethoxymethyl Glycoluril | 10 | 10 | 10 | 5 | 8 |
| Catalyst Trifluoromethanesulfonic Acid Diethylamine salt | 0.24 | 0.24 | 0.24 | 0.24 | 0.24 |

TABLE 1B-continued

Gator Wrinkle Finishes in Various Formulations

| Ingredient | Ex 8 | Ex 9 | Ex 10 | Ex 11 | Ex 12 |
|---|---|---|---|---|---|
| Filler Wollastonite | 30 | 40 | 50 | 40 | 40 |
| Flow Control Resiflow P67 | 1.2 | 1.2 | 1.2 | 1.2 | 1.2 |
| Black pigment Carbon Black | 3 | 3 | 3 | 3 | 3 |
| Wrinkle Appearance | No Very weak Gator | Yes Gator | Yes Weak gator | Yes Gator | Yes Gator |
| Initial Adhesion | 5B | 5B | 5B | 5B | 5B |
| Appearance after 550° F. for 2 hours | Not tested | Retains gloss and pattern, slight yellowing | Retains gloss and pattern, slight yellowing | Retains gloss and pattern, slight yellowing | Retains gloss and pattern, slight yellowing |

Examples 5, 6, 7 (from TABLE 1A) and 8 illustrate effect of changing Si/PE ratio.
Examples 6, 9, 10 illustrate effect of changing wollastonite level.
Examples 9, 11, 12 illustrate varying the level of curing agent, Powderlink 1174.

As can be seen from the above Examples 1 and 4–12, a controlled wrinkle finish can be made in a variety of formulations in accordance with the present invention. As shown by Examples 2–3, use of too little triflic acid amine salt catalyst in combination with high filler loading may lead to a texture finish. As shown by Example 8, where triflic acid is used as a catalyst, the amount of silicone resin to polyester may be limited to control the wrinkle finish of a coating made from such a formulation.

TABLE 2

Wrinkle Finishes in Various Formulations

| Ingredient | Ex 13 | Ex 14 | Ex 15 | Ex 16 | Ex 17 | Ex 18 |
|---|---|---|---|---|---|---|
| Silicone Resin | 5 | 10 | 35 | 40 | 40 | 45 |
| Polyester Resin | 89.3 | 84.6 | 61.1 | 56.4 | 56.4 | 51.7 |
| Curing agent Tetramethoxymethyl Glycoluril | 5.7 | 5.4 | 3.9 | 3.6 | 3.6 | 3.3 |
| Catalyst Cyclamic Acid | 0.35 | 0.35 | 0.35 | 0.35 | 0.35 | 0.25 |
| Filler Wollastonite | 50 | 50 | 50 | 50 | 50 | 50 |
| Flow Control Resiflow P67 | 1.5 | 1.5 | 1.5 | 1.5 | 1.5 | 1.5 |
| Black pigment Carbon Black | 10 | 10 | 10 | 10 | 10 | 10 |
| Outgassing Agent Benzoin | 1 | 1 | 1 | 1 | 1 | 1 |
| Wrinkle Appearance | Yes Wrinkle | Yes Wrinkle | Yes Wrinkle | Yes Blotchy Wrinkle | Yes Blotchy wrinkle | No Texture |
| Initial Adhesion | 5B | 5B | 5B | 5B | 5B | 5B |
| Appearance after 550° F. for 2 hours | Retains gloss and pattern, slight color change | Retains gloss and pattern, slight color change | Slight loss of gloss, no change in pattern | Loss of gloss and wrinkle pattern | Loss of gloss and wrinkle pattern | Slight loss of gloss |

Examples 13–18 illustrate varying the level of silicone and polyester.

As shown by Examples 16, 17 and 18, the use of a higher ratio of silicone resin to polyester resin can adversely affect wrinkle finish control when using a cyclamic acid catalyst. As shown by Example 18, use of a relatively low cyclamic acid content can additionally adversely affect control of the wrinkle finish.

We claim:

1. A powder composition for forming a heat stable wrinkle finish comprising a resin consisting essentially of one or more than one silicone resin having a condensable hydroxyl content of from 2% by weight to 7% by weight, a curing agent, and a wrinkle finish forming catalyst.

2. A powder composition for forming a heat stable wrinkle finish comprising one or more than one hydroxyl functional resin, one or more than one silicone resin having a condensable hydroxyl content of from 2% by weight to 7% by weight, a curing agent, and a catalyst selected from the group consisting of an amine triflate and cyclamic acid.

3. A powder composition as claimed in claim 2, wherein said silicone resin is a compound of formula (I):

wherein each of $R_x$ and $R_y$ is independently a monovalent hydrocarbon group, another group of formula (I), or $OR^1$, wherein $R^1$ is H or an alkyl or an aryl group having 1 to 24 carbon atoms, and wherein each of x and y is a positive number such that $0.8 \leq (x+y) \leq 4.0$.

4. A powder composition as claimed in claim 2, further comprising
a filler.

5. A powder composition as claimed in claim 2 wherein said hydroxyl functional resin is an acrylic or a polyester resin.

6. A powder composition as claimed in claim 5 wherein said acrylic resin has a glass transition temperature (Tg) of 45° C. or higher and a hydroxyl number, absent functionalization or blocking, of from 0.7 to 50 and said polyester resin has a hydroxyl number, absent functionalization or blocking, of from 20 to 50 and an acid number, absent functionalization or blocking, of 12 or less.

7. A powder composition for forming a heat stable wrinkle finish comprising
a polyester resin having, absent functionalization or blocking, a hydroxyl number of from 20 to 50 and an acid number of 12 or less, an acrylic resin having a glass transition temperature (Tg) of 45° C. or higher and a hydroxyl number, absent functionalization or blocking, of from 0.7 to 50, or a mixture thereof,
one or more than one silicone resin having a condensable hydroxyl content of from 2% by weight to 7% by weight,
a curing agent, and
a wrinkle finish forming catalyst.

8. A powder composition as claimed in claim 1, further comprising a carbamates group-containing polymer.

9. A powder composition as claimed in any one of claims 1 to 8, wherein said wrinkle finish forming catalyst is selected from the group consisting of amine triflate and cyclamic acid.

10. A heat stable wrinkle finish coating on a substrate, which is formed from the powder composition as claimed in claim 9.

* * * * *